United States Patent [19]

Smith

[11] Patent Number: 5,226,509

[45] Date of Patent: Jul. 13, 1993

[54] AT-A-GLANCE BRAKE TRAVEL INDICATOR

[75] Inventor: Richard W. Smith, Salem, Ohio

[73] Assignee: At-A-Glance, Inc., Salem, Ohio

[21] Appl. No.: 829,974

[22] Filed: Feb. 3, 1992

[51] Int. Cl.⁵ .............................................. F16D 66/02
[52] U.S. Cl. .................................. 188/1.11; 92/5 R; 116/208; 340/454
[58] Field of Search ...................... 188/1.11; 340/454; 116/208, 284, 285; 92/5 R

[56] References Cited

U.S. PATENT DOCUMENTS

| | | | |
|---|---|---|---|
| 4,279,214 | 7/1981 | Thorn | 188/1.11 |
| 4,583,071 | 4/1986 | Sebalos | 188/1.11 |
| 4,642,603 | 2/1987 | Martinez | 188/1.11 |
| 4,757,300 | 7/1988 | Sebalos | 188/1.11 |
| 4,776,438 | 10/1988 | Schandelmeirer | 188/1.11 |
| 4,800,991 | 1/1989 | Miller | 188/1.11 |
| 4,879,964 | 11/1989 | Emerson | 188/1.11 |
| 5,140,932 | 8/1992 | Goldfein et al. | 188/1.11 |

*Primary Examiner*—Robert J. Oberleitner
*Assistant Examiner*—Kevin D. Rutherford
*Attorney, Agent, or Firm*—Frederic E. Naragon

[57] ABSTRACT

A Brake Travel Indicator for use on a vehicle having a plurality of air brake assemblies secured to the undercarriage of the vehicle and stationary with respect thereto, responsive solely to the linear movement of the push rod clevis of each air brake assembly to provide a visible indication of excess linear movement of the push rod clevis and probable need for brake maintenance as well as an indication of the particular wheel where such maintenance is probably needed and comprising a travel indicator tube which slideably engages with a fixed reference tube to slide in and out of said reference tube to provide visible indication of probable need for brake maintenance and an electrical monitoring system cooperating with the travel indicator tube comprising a continuous electrical circuit connected to a remote display panel with a plurality of multicolored lamps to indicate excess brake travel by one colored lighted lamp, to indicate open circuit or power loss condition by lack of lighted colored lamps, and to indicate normal brake travel and system operational by another color lighted lamp, and a power source either within or remote from the vehicle to energize the electrical system.

107 Claims, 7 Drawing Sheets

AT-A-GLANCE BRAKE TRAVEL INDICATOR

BACKGROUND OF THE INVENTION

This invention relates in general to monitoring air brake systems for maintenance and operating safety and in particular to air brake systems found on heavy and medium trucks and buses.

In 1988, over 6,000 deaths, 160,000 injuries and countless millions of dollars in related expenses were attributed to motor carrier crashes involving heavy and medium truck and bus accidents (The Private Carrier, June 1990, pg. 13). "Out-of-adjustment brakes continue to be the number one defect in vehicle safety inspections. Fleets and owner-drivers either don't know how often brakes need adjustment, or aren't checking often enough" (Heavy Duty Trucking, November 1990, pg. 104).

Due to the absence of brake travel indicating devices, maintenance people, operators and all such involved persons must spend excess hours and manpower, often under inclement conditions, performing time-consuming and sometimes unnecessary brake maintenance procedures, procedures and manpower that could be more efficiently utilized with the use of a truly functional, durable and practical brake travel indicating system. Such a system would yield not only a more efficient cost-effective use of maintenance resources but would provide a greater margin of operating safety especially when necessary brake maintenance adjustments are neglected. Individual operators have no convenient way of knowing the braking capability of such vehicles and would also greatly benefit from readily available information discovered by a functional, durable, and practical brake travel indicating system that would provide an electrically supervised remote indicating display device as well as a local mechanical display device at the brake site. Some examples of prior art brake wear indicators are set forth in patents briefly described below:

U.S. Pat. No. 4,279,214 issued to Thorn discloses a loosely fitting sleeve with external indicia that installs over the pneumatic actuator pushrod of an air brake assembly and is frictionally engaged in the actuator housing push rod aperture Upon application of brakes, an internal diaphragm moving forward pushes the indicator outward exposing indicia that corresponds to push rod travel. The Thorn device is not easily observable at a distance and in some cases, not at all due to the actuator being awkwardly positioned and accumulation of road grime. No provision is made for remote indication capabilities.

U.S. Pat. Nos. 4,583,071 and 4,757,300 issued to Sebalos provide magnet and reed switch combinations where the magnet is adjustably secured to the pneumatic actuator pushrod of an air brake assembly which, when extended, will by magnetic flux operate a correspondingly mounted reed switch. The Sebalos devices make no provision for a locally displayed warning indicator and rely entirely upon electrically operated warning displays. A broken wire or power failure would render the systems inoperative and could promote a false sense of security by failing to annunciate an overtravel condition.

U.S. Pat. No. 4,642,603 issued to Martinez provides for an array of various contacts and spring mechanisms that are internal to the pneumatic actuator housing of an air brake assembly so that forward movement of the internal diaphragm closes corresponding contacts in turn lighting indicator lamps. Retrofitting existing actuators with this invention would be extremely difficult. The contacts are exposed to the severe elements of weather making them unreliable due to contact fouling from corrosion and road grime. No local mechanical display is provided. Fouled contacts and/or broken conductors would prevent overtravel warning leaving the operator with a false sense of security.

U.S. Pat. No. 4,776,438 issued to Schandelmeirer provides an adjustably locatable pointer suspended forwardly by a slotted bracket arrangement providing a stationary reference point against which the center line of a clevis pin of an air brake assembly may be referenced to determine overtravel. Reading accuracy would be compromised at different angles, brakes must be energized to read overtravel and no remote signaling means is provided.

U.S. Pat. No. 4,800,991 issued to Miller provides for an adjustable sliding aperture attached to the pushrod of an air brake assembly that cradles a pivotable spring-loaded telescoping flag arrangement that indicates only when overtravel occurs. Through independent switching means a remote signal can be provided. Failure of the switch or an open circuit would disable remote indication capabilities leaving the operator with a false sense of security. Confusion could occur due to nonsynchronization of electrical and mechanical detection means. Springs associated with the telescoping flag arrangement are prone to fatigue and breakage rendering the system unreliable. The sliding aperture requires access to an exposed portion of the pushrod for attachment. In many short-stroke actuators the exposed portion is not available making attachment impractical. No provision is made for universal adaptation to the various schemes of air brake mounting arrangements. The biasing spring of the system greatly increases the wear factor at tip of the flag and hole of the aperture reducing service life.

U.S. Pat. No. 4,879,964 issued to Emerson provides an adjustment marker secured to the pushrod of an air brake assembly comprising a round ball chain of a predetermined length with a snap at one end and a clamp at the other. Attached near the snap end is an indicator flag. With the clamp end attached to the brake actuator pushrod and the pushrod in an over-extended position, the snap releases dropping the flag downwardly. No provision is made to remotely indicate brake overtravel condition. The chain is susceptible to premature release due to impact from road debris, rocks, excessive icing and vibration. The clamp arrangement requires access to an exposed portion of the pushrod that is not available on many short-stroke brake actuators.

Whatever the precise merits, features and advantages of the aforecited references, none fulfills the purposes of the present invention.

Therefore, the principal object of the present invention is to reliably monitor and deliver critical brake overtravel information in such a way so as to provoke operating and/or maintenance personnel to perform corrective maintenance procedures on air brake systems primarily for heavy and medium trucks and buses.

Another principal object of the present invention is to provide dual brake travel indicating devices that operate dependently and reliably in a master/slave configuration.

A further object of the present invention is to provide multiple indicators that are easily and conveniently observed to encourage an operator to regularly inspect said devices and brakes.

Still another object of the present invention is to achieve a greater margin of operating safety for both driver and equipment hence enhancing the general public safety.

A further object of the present invention is to render said devices easily and universally installable and maintainable on all applicable vehicles by non-technical personnel.

Another object of the present invention is to enhance long service life due to materials and designs incorporated into this invention.

A further object of the present invention is to provide a method of quickly testing for brake overtravel from a remote location, i.e.: the front of a trailer, with a portable handheld test unit.

An additional object of the present invention is to provide electrical supervision of the monitoring circuit to enhance overall safety performance by detecting trouble such as broken wires, loss of power, poor connections, etc. and displaying such.

In general, on many vehicles utilizing brake systems with a plurality of pneumatic actuators comprising an elongated pushrod connected to a motion translating device such as a slack adjuster, linear motion directly proportional to the overall movement of the brake system can be monitored at the centerline of the clevis pin used to connect the elongated pushrod to the motion translating device. By elongating the non-head end of the clevis pin and slidingly placing a bored hole adapter plate over the extended portion of the elongated clevis pin, and by connecting the tang of the adapter plate to the internal diameter of a travel indicator tube, the free end of the travel indicator tube being slidingly suspended in an adjustable fixed reference tube and the fixed reference tube being adjustably attached to a universal extension bracket or existing mounting bracket, a unique means of monitoring overall brake travel is accomplished. When movement exceeds a predetermined limit as set by the length and placement of the fixed reference tube, the free end of the travel indicator tube pivots downwardly about its adapter end. In this freeswinging downward position, the travel indicator tube can be viewed from different angles and understood to represent an overtravel condition. Simultaneously, upon deployment of the travel indicator tube, an electrical monitoring system comprising a continuous electrical circuit with wiring, of environmentally tight multi-conductor cabling, connecting means, a switch means and sensing means, an intermediate junction box, remote display panel, power source, and overcurrent means operates to indicate a change in brake travel status on a remote indicating panel that in turn can be observed by an operator Additionally a maintenance person can sub-feed a non-powered vehicle's electrical system with a portable power source and by observing the remote indicating panel, can ascertain brake travel status. This unique maintenance method can be used to quickly inspect any number of parked and/or non-powered vehicles.

SUMMARY OF THE INVENTION

In general, the braking system on many heavy/medium truck and bus type vehicles, comprises a pneumatic actuator, an elongated pushrod disposed within the pneumatic actuator at one end and at the opposite end a clevis and clevis pin connecting the elongated pushrod to a motion translating device such as a slack adjuster which typically rotates an S-cam that engages the vehicle's brakes Accordingly, linear motion directly proportional to the overall movement of the brake system can be monitored at the centerline of the clevis pin connecting the elongated pushrod to the slack adjuster.

In the present invention, the original clevis pin of a brake assembly is replaced with a modified elongated clevis pin with a rust preventative coating, a plurality of orifices for adjustability, a chamfered tip, and an elongated shaft of length sufficient to provide lateral adjustability with an adapter plate fitted thereto. The adapter plate is comprised of an organic thermoplastic resin material sheet and has a bored hole sufficient to fit loosely over the elongated clevis pin (positioned and retained with flat washers and cotter pins through selected orifices), and a tang of length sufficient to provide lateral adjustability that slidingly, frictionally fits to the inside diameter of a travel indicator tube. The travel indicator tube is comprised of an organic thermoplastic resin material, the tube having an inside diameter sufficient to receive at one end the adapter plate tang and at the opposite end angle cut to prevent jamming at release point and coated with two different colored bands of a single component polyurethane air-dry material to prescribed depths (providing a gradual wear reference scale), the coated band end of the travel indicator tube being slidingly supported by an adjustable fixed reference tube. The fixed reference tube is comprised of a baseplate with a plurality of orifices for adjustability and mounting of switch and sensing means and a tube having length equal to the recommended maximum operating stroke of the associated pneumatic actuator of the brake assembly which tube is attached to the baseplate. The fixed reference tube is secured to one end of a universal extension bracket. The extension bracket is comprised of rigid flat stock material with offset bends at one end and at the opposite end of the bracket there is a U-shaped clamp having means suitable for securing it to a vehicle brake assembly. The fixed reference tube may also be secured to a flat stock extension arm secured to the axle housing of the vehicle.

When linear movement of the elongated clevis pin (corresponding to overall brake travel) exceeds the prescribed limit, the travel indicator tube, operating in an extended parallel plane and being slidingly supported by the fixed reference tube moves out of the fixed reference tube as can be visibly determined by the color banding and if unattended to, eventually moves completely out of the fixed reference tube and pivots downwardly about its adapter end and in its free-swinging position indicates a brake overtravel condition. Simultaneously, sensing means cooperating with the travel indicator tube activates switch means mounted on the fixed reference tube transmitting an electrical signal to a remote display panel through a supervised electrical monitoring system.

The electrical monitoring system comprises an overcurrent means (CB), switch means (SW), junction box (JB), resistors (R1) and (R2), bridge rectifier (BR), zener diode (ZD), light emitting diodes (LED1) and (LED2), wiring and wiring techniques suitable for weathertight interconnection of said components.

With SW contacts held open (indicator tube not deployed, normal brake travel and system functional), bipolar voltage derived from vehicle brake light circuit flows through CB and is reduced by R1 (parallel connected to SW contacts) to approximately 7 volts which is then applied through JB to BR, polarizing said voltage for compatibility with solid state devices. Polarized voltage from BR flows through R2 lighting LED1 (green) indicating normal brake travel and system operational. ZD requires approximately 7.8 volts to breakover its "threshold limit" and light LED2. Therefore, LED2 remains unlit. When brake overtravel occurs (travel indicator tube pivots downwardly and SW contacts close bypassing R1), system voltage rises to 12 volts, flows through BR and R2 lighting LED1 brighter and breaking over ZD threshold limit lighting LED2 (red) thereby indicating brake overtravel. In the event of a short circuit occurring in the monitoring system, CB acts to disconnect monitoring system from vehicle brake light circuit allowing continued operation of vehicle brake lights.

An alternative supervised electrical monitoring system comprises an overcurrent means (CB), switch means (SW), resistor (R1), junction box (JB), bridge rectifier (BR), zener diode (ZD), capacitor (C1), silicon controlled rectifier (SCR), incandescent lamps (L1) and (L2), wiring and wiring techniques suitable for weathertight interconnection of said components.

With SW contacts held open (travel indicator tube not deployed, normal brake travel and monitoring system functional), bipolar voltage derived from the vehicle brake light circuit flows through CB and is reduced by R1 (parallel connected across SW contacts) to approximately 8 volts which flows through JB to energize L1 (green; normal brake travel and system functional) and BR polarizing voltage for compatibility with solid state devices. Reduced polarized voltage from BR is insufficient to breakover ZD "threshold limit" to turn on SCR and illuminate L2. When brake overtravel occurs (travel indicator tube drops and SW closes bypassing R1), system voltage rises to 12 volts more brightly illuminating L1 and flowing through BR will now breakover ZD threshold limit and turn on SCR (C1 prevents false triggering of SCR) illuminating L2 (red, indicating brake overtravel). In the event of a short circuit occurring in the monitoring system, CB acts to disconnect monitoring system from vehicle brake light circuit allowing continued operation of vehicle brake lights.

Another alternative supervised electrical monitoring system comprises an over-current means (CB), bridge rectifier (BR), integrated circuit (IC1), switch (SW), resistor (R1), and bicolor light emitting diode (LED), wiring and wiring techniques suitable for weathertight interconnection of said components.

Energized from existing brake light circuitry, voltage flows through CB into BR (polarizing voltage for the solid state devices) energizing IC1 and contacts 1 and 2 of SW. With contacts 1 and 3 closed (brake travel normal and monitoring system functional) negative polarity voltage flows into R1 and inverter input of IC1 energizing green portion of LED. When brake overtravel occurs, contacts 2 and 3 close flowing positive polarity voltage into R1 and inverter input of IC1 energizing red portion of LED while simultaneously extinguishing green portion. System trouble is indicated when neither the green nor red portion of LED is energized.

A self-energized portable power source comprising a housing, a removable rechargable battery (BAT), switch means (SW), wire cable (WC), and connecting means (CON) suitable for mating to vehicle's electrical service plug may be employed as a power source in lieu of the vehicle's power source. Thus, maintenance personnel can quickly subfeed a nonpowered vehicle's brake light circuit and determine from observation of the remote display panel lamps brake overtravel thereby greatly increasing the efficiency of detecting brake overtravel regardless of fleet size.

DETAILED DESCRIPTION OF THE DRAWINGS

Figure 1:
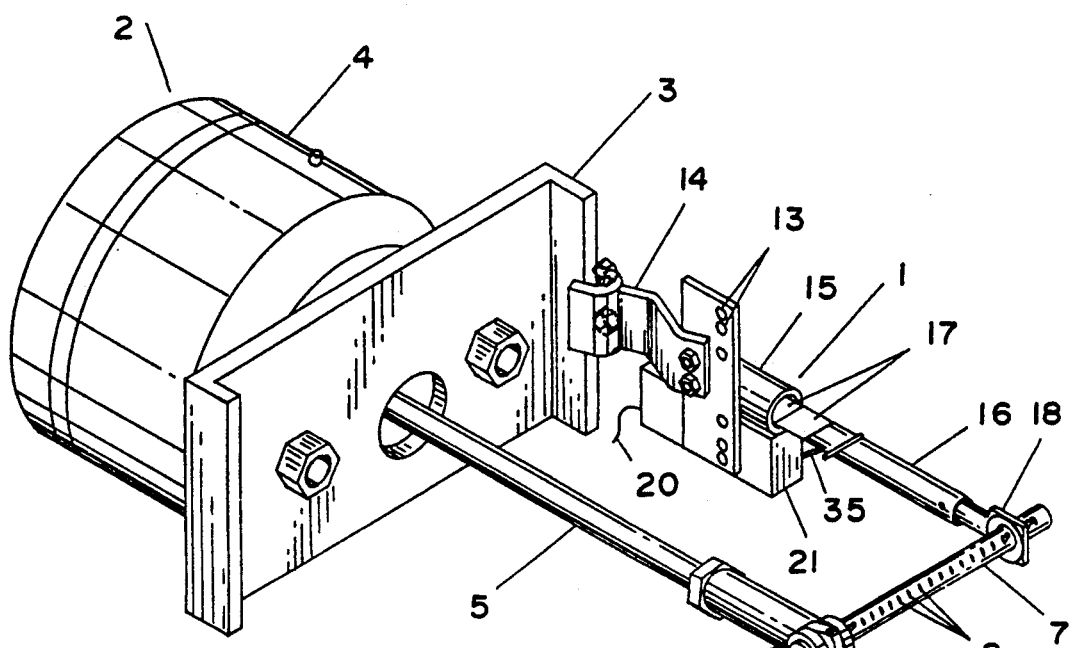
FIG. 1 is a perspective view of the preferred embodiment of the mechanical assembly of the invention.

Reference is now made to the drawings wherein the present invention is illustrated in detail and wherein similar components bear the same reference numeral throughout the several views.

FIG. 1 is a perspective view of the preferred embodiment of the mechanical assembly 1 of the invention, and illustrates an air brake assembly 2 comprising an air brake chamber 4, an air brake mounting bracket 3, an air brake push rod 5, a push rod clevis 6, angular translating device 9, and an air brake cam assembly 10. The preferred embodiment of the mechanical assembly 1 of the invention illustrates an elongated clevis pin 7, a plurality of clevis pin orifices 8, a travel indicator tube 16, a fixed reference tube 15, a universal extension bracket 14, plurality of adjusting orifices 13, a switch means 21, sensing means 35, wiring 20, color banding 17 and adapter plate 18.

Figure 2:
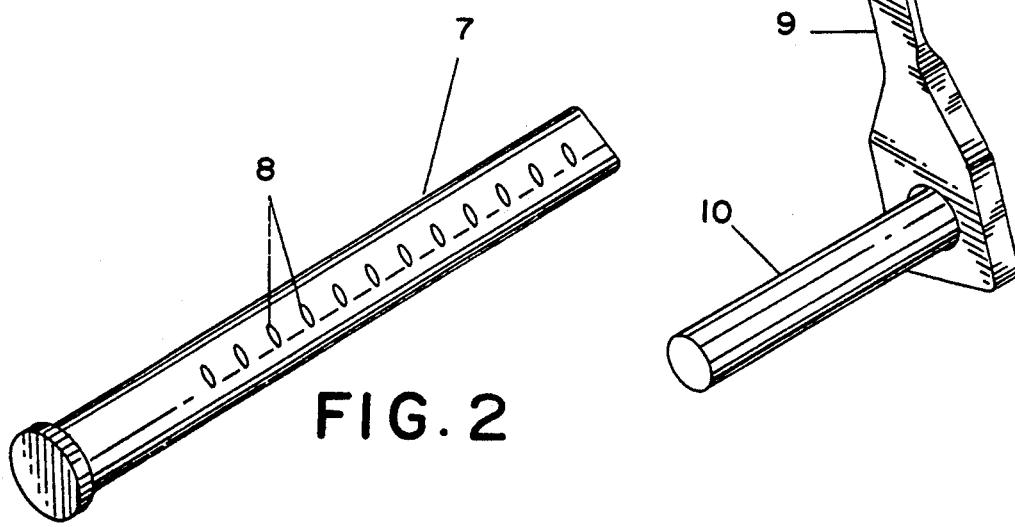
FIG. 2 is a perspective view of the elongated clevis pin of the invention.

FIG. 2 illustrates a perspective view of the elongated clevis pin 7 and a plurality of clevis pin orifices 8.

Figure 3:
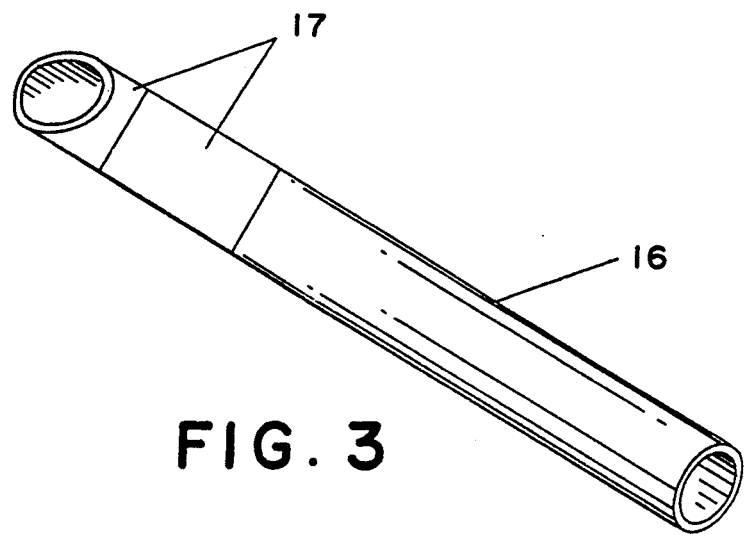
FIG. 3 is a perspective view of the travel indicator tube.

FIG. 3 illustrates a perspective view of the travel indicator tube 16 with color banding 17.

Figure 4:
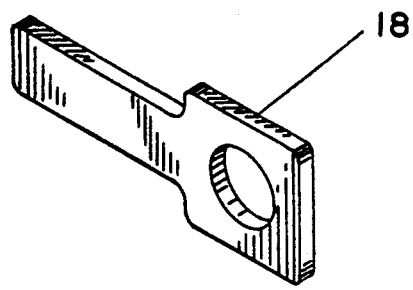
FIG. 4 is a perspective view of the adapter plate.

FIG. 4 is a perspective view of adapter plate 18.

Figure 5:
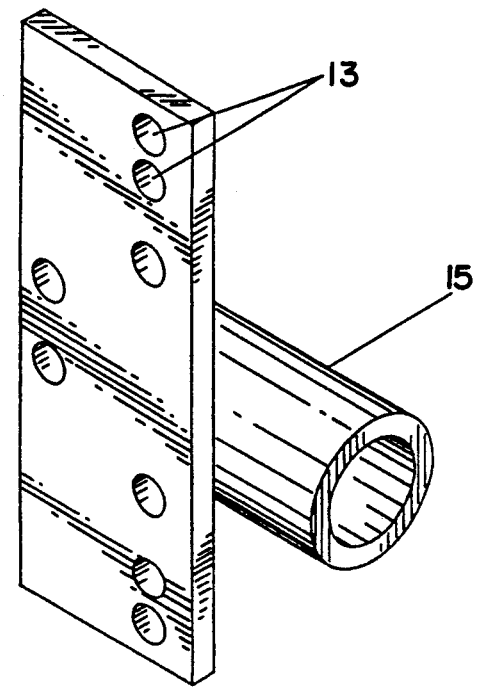
FIG. 5 is a perspective view of the preferred embodiment of the fixed reference tube.

FIG. 5 is a perspective view of the preferred embodiment of the fixed reference tube 15 and a plurality of adjusting orifices 13.

Figure 6:
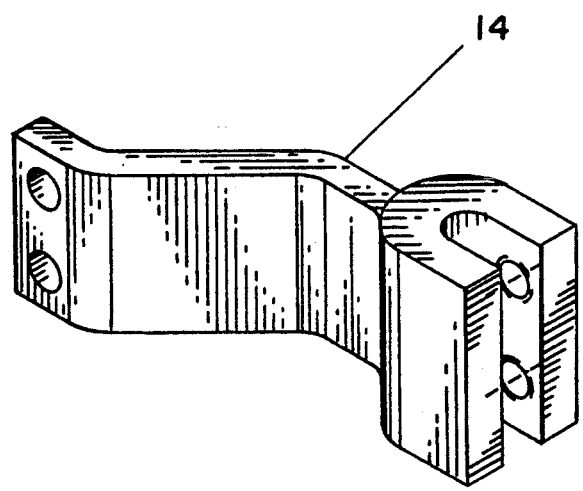
FIG. 6 is a perspective view of the universal extension bracket.

FIG. 6 is a perspective view of the universal extension bracket 14.

Figure 7:
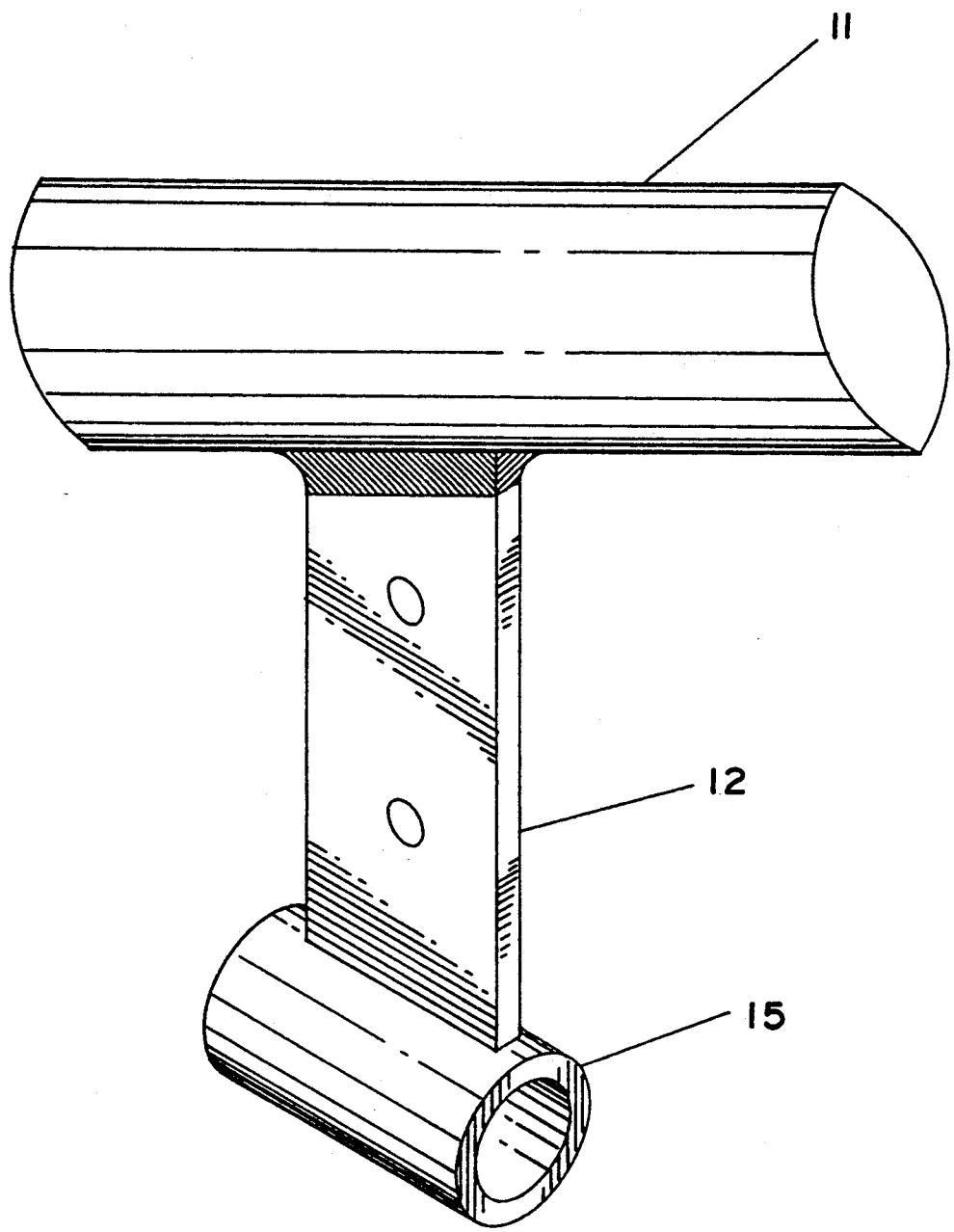
FIG. 7 is a perspective view of an alternate fixed reference tube and securing device.

FIG. 7 is a perspective view of an alternative fixed reference tube 15, extension arm 12, and vehicle axle housing 11.

Figure 8:
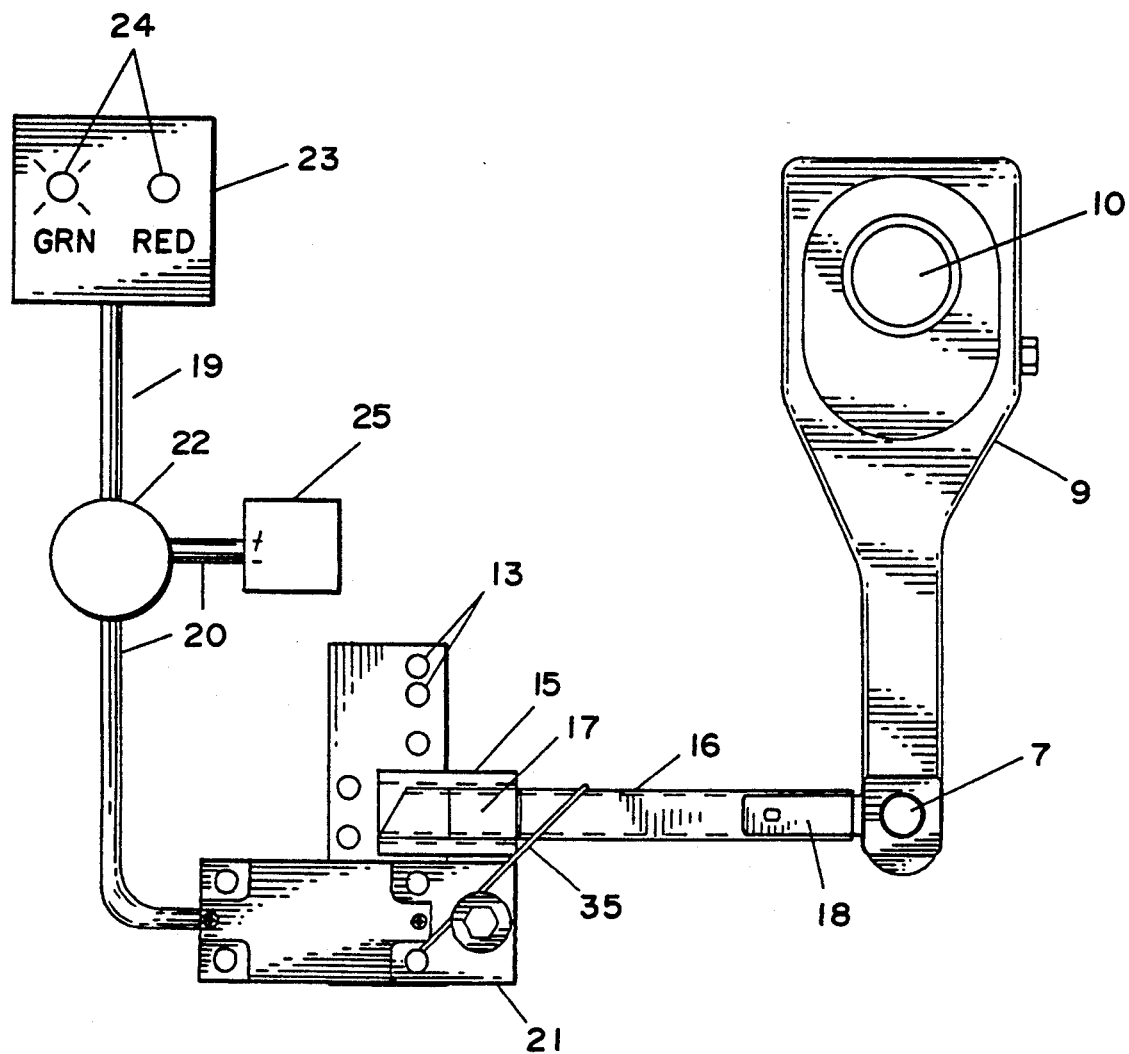
FIG. 8 is a side view of the travel indicator tube engaged within the fixed reference tube and the components of the electrical monitoring system.

FIG. 8 is a side view of the travel indicator tube 16 engaged within the fixed reference tube 15 and the electrical monitoring system 19. Part of the preferred embodiment of the mechanical assembly 1 of the invention is illustrated comprising air brake cam assembly 10, angular translating device 9, elongated clevis pin 7, adapter plate 18, travel indicator tube 16, color banding 17, fixed reference tube 15, and a plurality of adjusting orifices 13. The components of the electrical monitoring system 19 are illustrated comprising switch means 21, a sensing means 35, wiring 20, an intermediate junction box 22, a power source 25, a remote display panel 23, and color lighted lamps 24.

Figure 9:
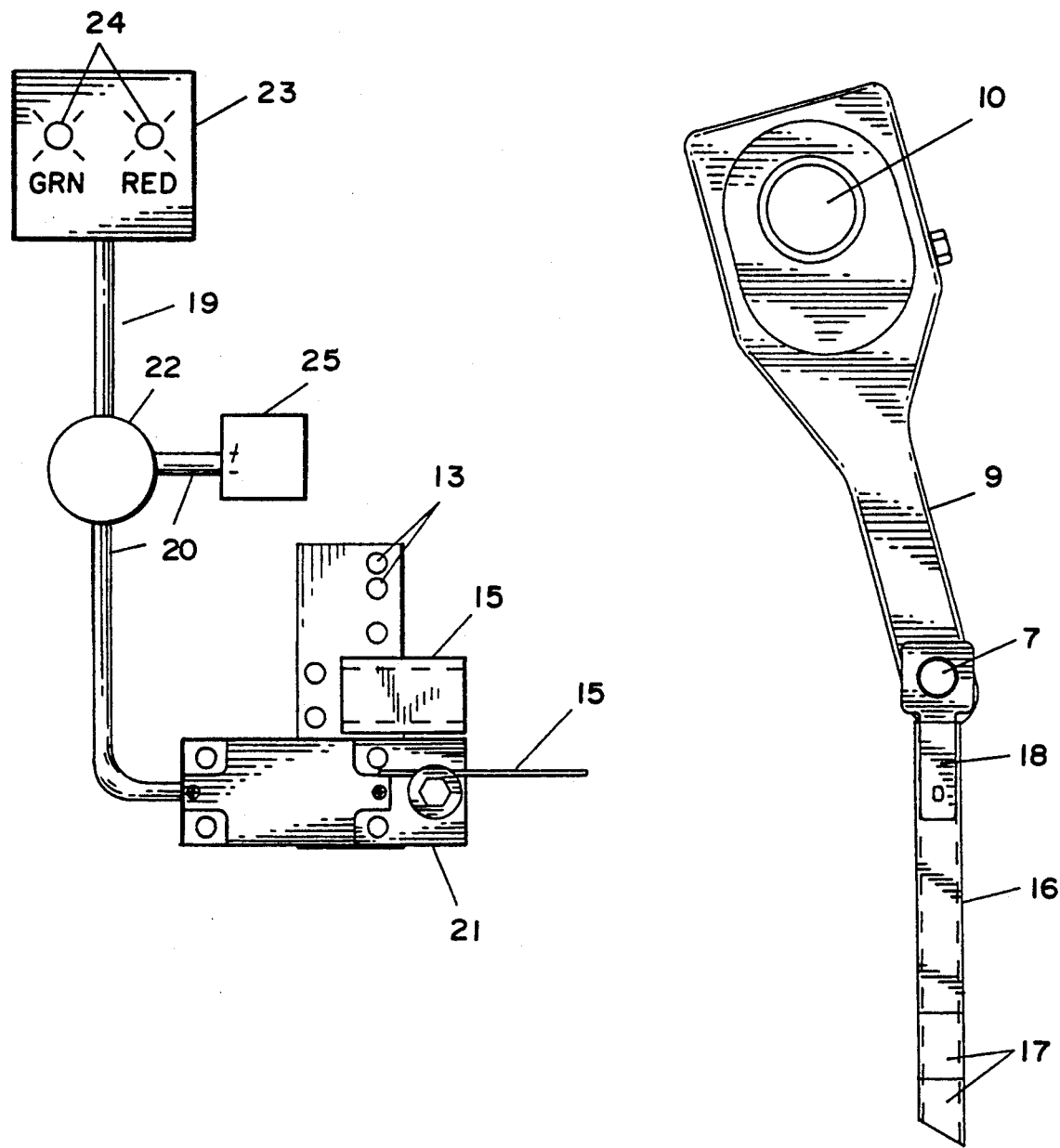
FIG. 9 is a side view of the travel indicator tube moved away from the fixed reference tube and the components of the electrical monitoring system.

FIG. 9 is a side view of the travel indicator tube 16 moved away from the fixed reference tube 15 and the components of the electrical monitoring system 19. A part of the preferred embodiment of the mechanical assembly 1 of the invention is illustrated comprising air brake cam mechanism 10, angular translating device 9, elongated clevis pin 7, adapter plate 18, travel indicator tube 16, color banding 17, fixed reference tube 15, and a plurality of adjusting orifices 13. The components of the electrical monitoring system 19, are illustrated comprising switch means 21, sensing means 35, wiring 20, an intermediate junction box 22, power source 25, remote display panel 23, and color lighted lamps 24.

Figure 10:
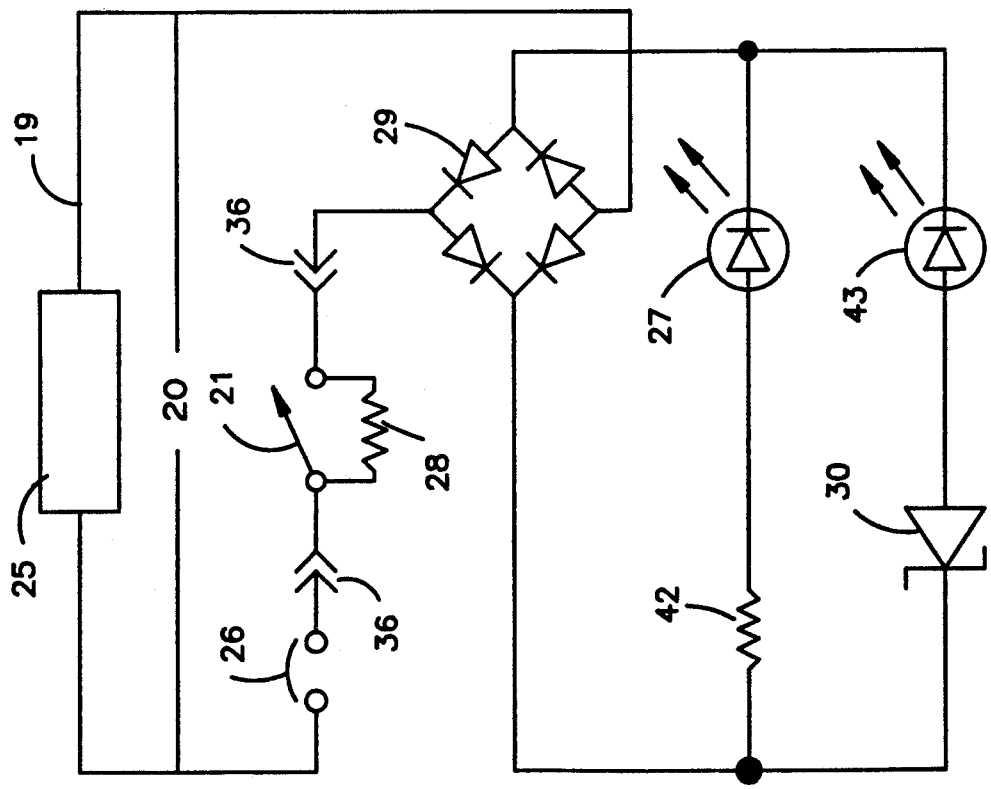
FIG. 10 is a schematic diagram of a two color two light emitting diode (LED) electrical monitoring system.

FIG. 10 is a schematic diagram of a two color two light emitting diode (LED) electrical monitoring system 19, comprising power source 25, over-current means 26, switch means 21, connecting means 36, resistors 28 and 42, full wave bridge rectifier 29, light emitting diodes (LED) 27 and 43, and zener diode 30.

Figure 11:
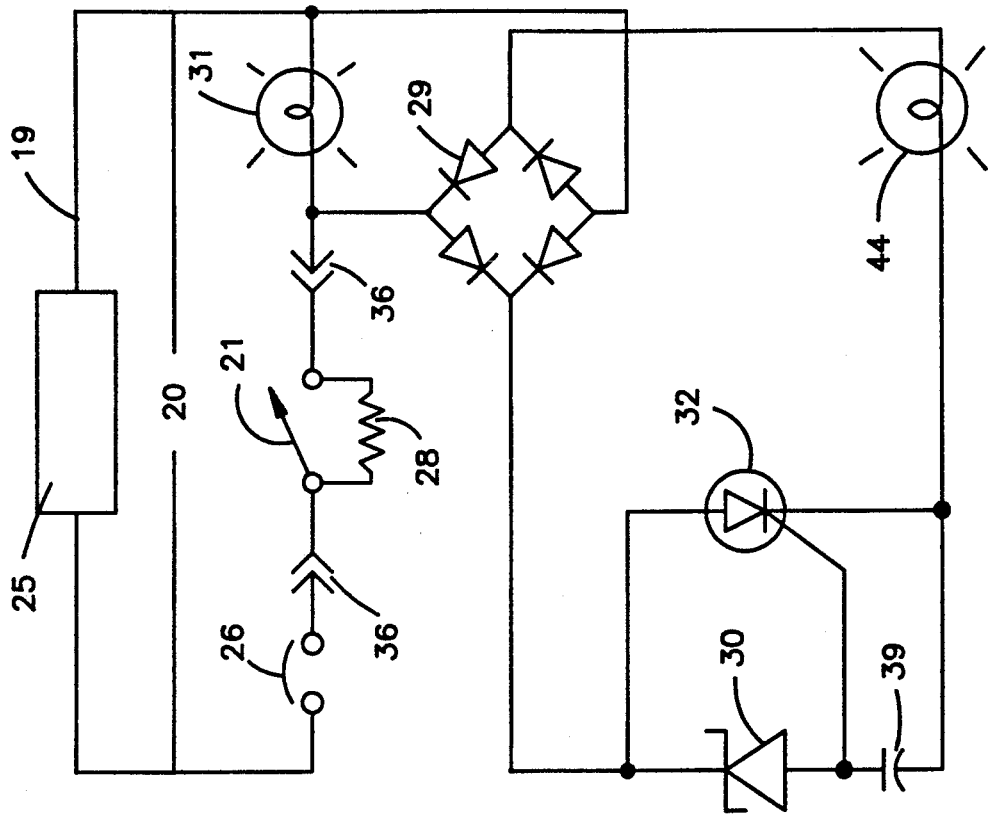
FIG. 11 is a schematic diagram of a two color two incandescent lamp electrical monitoring system.

FIG. 11 is a schematic diagram of a two color two incandescent lamp electrical monitoring system 19 comprising power source 25, wiring 20, over-current means 26, switch means 21, connecting means 36, resistor 28, incandescent bulbs 31 and 44, full wave bridge rectifier 29, zener diode 30, silicon controlled rectifier 32, and capacitor 39.

Figure 12:
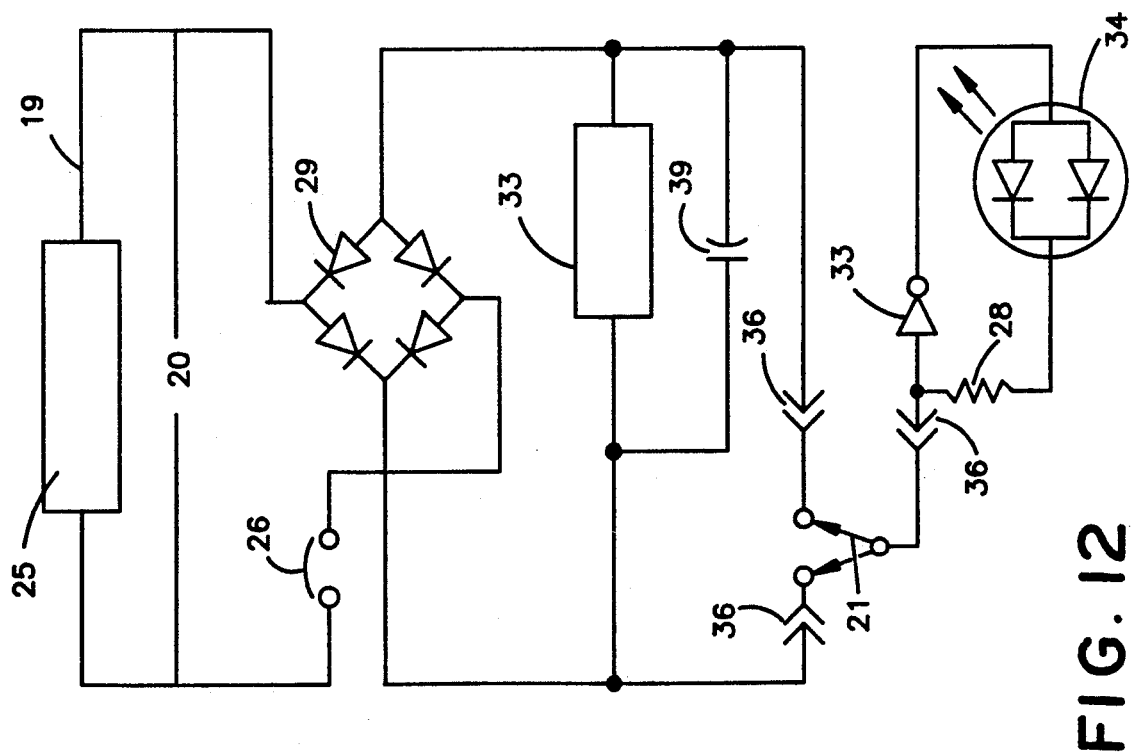
FIG. 12 is a schematic diagram of a single bicolored light emitting diode (LED) electrical monitoring system with integrated circuit driver.

FIG. 12 is a schematic diagram of a single bicolored light emitting diode (LED) electrical monitoring system 19 with integrated circuit driver 33 comprising power source 25, wiring 20, over-current means 26, full wave bridge rectifier 29, integrated circuit driver 33, capacitor 39, connecting means 36, switch means 21, resistor 28 and bicolored light emitting diode 34.

Figure 13:
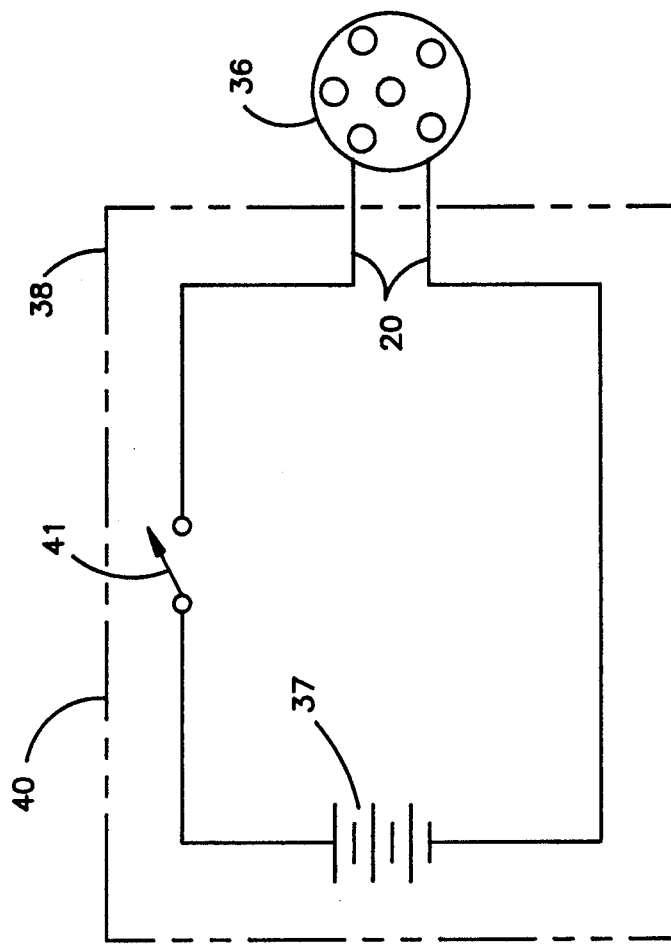
FIG. 13 is a schematic diagram of the self-energized portable test unit.

FIG. 13 is a schematic diagram of the self-energized portable test unit 40 comprising switch means 41, housing 38, battery 37, wiring 20, and connecting means 36.

DESCRIPTION OF THE PREFERRED EMBODIMENT

Referring now to FIG. 1 a preferred embodiment of the mechanical assembly 1 of the present invention is shown as it would be installed on a conventional S-cam type air brake system found on many medium/heavy truck and bus type vehicles.

In general, air entering air brake chamber 4, secured to vehicle undercarriage mounting bracket 3, expands an internal rubber diaphragm which (usually an S-cam) via angular translating device 9 (commonly known as a slack adjuster) and engages the vehicle's brake. The slack adjuster 9 is coupled to air brake pushrod 5 by pushrod clevis 6 and an elongated clevis pin 7. In this preferred embodiment, the original clevis pin is replaced with a modified elongated clevis pin 7 as also illustrated in FIG. 2 comprising an extended shaft, a plurality of orifices 8, chamfered tip, and weather resistance plating. An adapter plate 18 as also illustrated in FIG. 4 is loosely fitted over the extended shaft of elongated clevis pin 7 through its bore and is laterally adjustable along the length of the elongated clevis pin. After calibration, adapter plate 18 is retained preferably by flat washers on either side and cotter pins through selected clevis pin orifices 8. The tang of adapter plate 18 is frictionally fitted to the inside diameter of a travel indicator tube 16 as also illustrated in FIG. 3 and together with color banding 17 form a free moving indicator means. After calibration, adapter plate 18 is secured to the travel indicator tube 16 preferably by cotter pin through the tang and a portion of the travel indicator tube 16. A universal extention bracket 14 as also illustrated in FIG. 6 is secured to the vehicle undercarriage at the air brake mounting bracket 3 preferably by screw clamping means, thus, making the universal extension bracket 14 adjustable. A fixed reference tube 15 as also illustrated in FIG. 5 is secured to an end of the universal extension bracket 14 with fastening means through selected orifices 13, and thus is adjustable. With a vehicle's brake fully released, the colored banding 17 of the travel indicator tube 16 is inserted into the fixed reference tube 15 to a prescribed depth. As the travel indicator tube 16 slides freely in and out of the fixed reference tube 15, brake travel can be determined by the amount of color banding 17 exposed. When overtravel occurs, the tip of the travel indicator tube 16 clears the end of the fixed reference tube 15 and pivots downwardly about the axis of elongated clevis pin 7 giving clear indication of brake overtravel.

This present invention is further enhanced by the addition of switch means 21 as also illustrated in FIGS. 8 and 9 secured through selected orifices 13 to the fixed reference tube 15 in such a position so as to allow sensor means 35 to cooperate with the travel indicator tube 16 for the purpose of sensing the deployment of the travel indicator tube 16 when overtravel occurs. This arrangement provides positive simultaneous operation of both the mechanical assembly 1 and electrical monitoring system 19. Current flowing at all times through resistor 28 as illustrated in FIG. 10 and associated wiring 20 lights colored LED 27 indicating no brake overtravel and monitoring system functional. When overtravel occurs, contacts of switch means 21 close bypassing resistor 28 and lights colored LED 43 indicating brake overtravel.

Additionally, a remote self-energized portable test unit 40 as illustrated in FIG. 13 can be used to individually energize the supervised electrical monitoring system 19 of a number of vehicles thereby quickly determining a brake overtravel or system trouble condition.

The following is a summary of the design intents and concepts of the present invention delineating features essential to the proper operation of this invention.

The bore of adapter plate 18 would be approximately 12% larger than the diameter of clevis pin 7 preventing the binding of rotational movement of adapter plate 18 about clevis pin 7 due to the accumulation of dirt and grime. The tang portion of adapter plate 18 is of length sufficient to permit adjustment of overall length of travel indicator tube 16/adapter plate 18 combination to facilitate recalibration after brake system repair.

The fixed reference tube 15 has an inside diameter approximately 25% larger than the outside diameter of the travel indicator tube 16. This clearance permits unhindered operation of travel indicator tube 16 in and out of the fixed reference tube 15 regardless of dirt or ice build-up. The plurality of orifices 13 in cooperation with universal extension bracket 14 permits mounting in various positions as well as providing mounting for switch means 21

Tubular construction of the travel indicator tube 16 provides for high visibility from all viewing angles. Lightweight construction materials and color banding 17 with single component polyurethane air-dry material at the tip of the travel indicator tube 16 lessens the frictional wear from sliding as well as impact damage from vibration. Angle cutting the tip of the travel indicator tube 16 prevents jamming at the point of release from the fixed reference tube 15 insuring positive deployment of the travel indicator tube 16.

Although the present invention has been described in preferred form with a certain degree of particularity, it is understood that the present disclosure of the preferred form has been made only by way of example and numerous changes in the details of construction and the combination arrangement of parts may be resorted to without departure from the spirit and scope of the invention as hereinafter claimed.

What is claimed is:

1. A brake travel indicator for use on a vehicle having a plurality of air brake assemblies secured to the undercarriage of said vehicle by a mounting bracket and stationary with respect thereto, each assembly comprising in part, a chamber responsive to an activating means supplied thereto and providing linear movement of a corresponding pushrod clevis which is movable with respect to said vehicle undercarriage and in turn functions to apply certain of the vehicle brakes, each said pushrod clevis attached to a corresponding pushrod extending from the corresponding chamber and coupled at one end to the chamber for movement therewith, each pushrod clevis coupled at the opposite end by a clevis pin to an angular translating device, the angular translating device coupled to a cam mechanism and cooperating therewith to apply the vehicle brakes, and each chamber and corresponding pushrod clevis applying the brakes of one wheel only of the vehicle, the improvement comprising a plurality of brake travel indicators each responsive solely to the linear movement of the pushrod clevis of each air brake assembly to provide a visible indication of excess linear movement of the pushrod clevis and probable need for brake maintenance as well as an indication of the particular wheel where such maintenance is probably needed, each brake travel indicator comprising a securing device to secure a fixed reference tube to the air brake assembly of the vehicle, a fixed reference tube secured to the securing device and adapted to slidably accept a travel indicator tube within, said travel indicator tube adapted at one end to slidably engage with the fixed reference tube and to slide in and out of said fixed reference tube to provide visible indication of corresponding movement of the pushrod clevis of the air brake assembly, said travel indicator tube adapted to accept and cooperate with a supervised electrical monitoring system and said travel indicator tube adapted at the other end to adjustably secure to an adapter plate, the adapter plate adapted at one end to adjustably secure to the travel indicator tube and at the other end adapted to pivotably secure to an elongated clevis pin and adapted to pivot axially about said elongated clevis pin, the elongated clevis pin adapted to pivotably secure to said adapter plate at one end and at the other end adapted to secure to the pushrod clevis of the air brake assembly, wherein the elongated clevis pin is calibrated with a plurality of orifices at uniform distances throughout its longitudinal surface to be utilized with and replacing the original clevis pin of any air brake assembly to provide adjustability for the adapter plate, and a supervised electrical monitoring system comprising a continuous electrical circuit with wiring of environmentally tight multi-conductor cabling, connecting means, a switch means and sensing means adapted to cooperate with each travel indicator tube, an intermediate junction box situated between the switch means and a remote display panel to connect the switch means and sensing means of each brake travel indicator to the remote display panel, and the remote display panel having with a plurality of multicolored lamps to indicate excess brake travel by one lighted color lamp, to indicate open circuit and power loss condition by lack of lighted colored lamps, and to indicate normal brake travel and system operational by another lighted color lamp and a power source adapted to connect to the continuous electrical circuit to energize the electrical system, and an over-current means to disconnect the continuous electrical circuit from the power source in the event of a short circuit.

2. The improvement of claim 1 wherein the securing device securing the fixed reference tube to the air brake assembly of the vehicle comprises a universal extension bracket secured at one end to the mounting bracket of the air brake assembly of the vehicle and at the other end adapted to adjustably accept and secure the fixed reference tube.

3. The improvement of claim 1 wherein the securing device securing the fixed reference tube to the air brake assembly of the vehicle comprises an extension arm secured at one end to the axle housing of the vehicle and at the other end adapted to accept and secure the fixed reference tube.

4. The improvement of claim 1 wherein the travel indicator tube slidably engages with the fixed reference tube only so long as the movement of the pushrod clevis of the air brake assembly remains within prescribed limits and wherein excess movement of the pushrod clevis of the air brake assembly moves the travel indicator tube away from the fixed reference tube freeing the travel indicator tube to axially pivot downwardly by gravity about the elongated clevis pin, alerting of the probability of needed brake maintenance.

5. The improvement of claim 4 wherein the securing device securing the fixed reference tube to the air brake assembly of the vehicle comprises a universal extension bracket secured at one end to the mounting bracket of the air brake assembly of the vehicle and at the other end adapted to adjustably accept and secure the fixed reference tube.

6. The improvement of claim 4 wherein the securing device securing the fixed reference tube to the air brake assembly of the vehicle comprises an extension arm secured at one end to the axle housing of the vehicle and at the other end adapted to accept and secure the fixed reference tube.

7. The improvement of claim 1 wherein color banding is provided at the slidable end of the travel indicator tube to indicate variable distance of travel of the travel indicator tube in and out of the fixed reference tube indicating corresponding movement of the pushrod clevis of the brake assembly, alerting of the probability of needed brake maintenance.

8. The improvement of claim 7 wherein the securing device securing the fixed reference tube to the air brake assembly of the vehicle comprises a universal extension bracket secured at one end to the mounting bracket of the air brake assembly of the vehicle and at the other end adapted to adjustably accept and secure the fixed reference tube.

9. The improvement of claim 7 wherein the securing device securing the fixed reference tube to the air brake assembly of the vehicle comprises an extension arm secured at one end to the axle housing of the vehicle and at the other end adapted to accept and secure the fixed reference tube.

10. The improvement of claim 4 wherein a sensing means is provided which cooperates with and activates the switch means of the electrical monitoring system and operates in a master/slave configuration cooperating with the travel indicator tube to sense when the travel indicator tube is engaged within the fixed reference tube holding the contacts of the switch means in one position and to sense when the travel indicator tube is deployed from the fixed reference tube holding the contacts of the switch means in a second position.

11. The improvement of claim 10 wherein the securing device securing the fixed reference tube to the air brake assembly of the vehicle comprises a universal extension bracket secured at one end to the mounting bracket of the air brake assembly of the vehicle and at the other end adapted to adjustably accept and secure the fixed reference tube.

12. The improvement of claim 10 wherein the securing device securing the fixed reference tube to the air brake assembly of the vehicle comprises an extension arm secured at one end to the axle housing of the vehicle and at the other end adapted to accept and secure the fixed reference tube.

13. The improvement of claim 1 wherein the power source is a self-energized portable test unit remote from the vehicle comprising a battery, a switch means, wiring, connecting means, and a housing, and adapted to temporarily connect to the continuous electrical circuit for the purpose of brake travel analysis and to energize the electrical monitoring system for operation.

14. The improvement of claim 1 wherein the power source is the vehicle power source in a vehicle having an electrical system.

15. The improvement of claim 4 wherein the power source is a self-energized portable test unit remote from the vehicle comprising a battery, a switch means, wiring, connecting means, and a housing, and adapted to temporarily connect to the continuous electrical circuit for the purpose of brake travel analysis and to energize the electrical monitoring system for operation.

16. The improvement of claim 4 wherein the power source is the vehicle power source in a vehicle having an electrical system.

17. The improvement of claim 15 wherein the securing device securing the fixed reference tube to the air brake assembly of the vehicle comprises a universal extension bracket secured at one end to the mounting bracket of the air brake assembly of the vehicle and at the other end adapted to adjustably accept and secure the fixed reference tube.

18. The improvement of claim 15 wherein the securing device securing the fixed reference tube to the air brake assembly of the vehicle comprises an extension arm secured at one end to the axle housing of the vehicle and at the other end adapted to accept and secure the fixed reference tube.

19. The improvement of claim 16 wherein the securing device securing the fixed reference tube to the air brake assembly of the vehicle comprises a universal extension bracket secured at one end to the mounting bracket of the air brake assembly of the vehicle and at the other end adapted to adjustably accept and secure the fixed reference tube.

20. The improvement of claim 16 wherein the securing device securing the fixed reference tube to the air brake assembly of the vehicle comprises an extension arm secured at one end to the axle housing of the vehicle and at the other end adapted to accept and secure the fixed reference tube.

21. The improvement of claim 10 wherein the power source is a self-energized portable test unit remote from the vehicle comprising a battery, a switch means, wiring, connecting means, and a housing, and adapted to temporarily connect to the continuous electrical circuit for the purpose of brake travel analysis and to energize the electrical monitoring system for operation.

22. The improvement of claim 10 wherein the power source is the vehicle power source in a vehicle having an electrical system.

23. The improvement of claim 21 wherein the securing device securing the fixed reference tube to the air brake assembly of the vehicle comprises a universal extension bracket secured at one end to the mounting bracket of the air brake assembly of the vehicle and at the other end adapted to adjustably accept and secure the fixed reference tube.

24. The improvement of claim 21 wherein the securing device securing the fixed reference tube to the air brake assembly of the vehicle comprises an extension arm secured at one end to the axle housing of the vehicle and at the other end adapted to accept and secure the fixed reference tube.

25. The improvement of claim 22 wherein the securing device securing the fixed reference tube to the air brake assembly of the vehicle comprises a universal extension bracket secured at one end to the mounting bracket of the air brake assembly of the vehicle and at the other end adapted to adjustably accept and secure the fixed reference tube.

26. The improvement of claim 22 wherein the securing device securing the fixed reference tube to the air brake assembly of the vehicle comprises an extension arm secured at one end to the axle housing of the vehicle and at the other end adapted to accept and secure the fixed reference tube.

27. The improvement of claim 1 wherein the supervised electrical monitoring system comprises an over-current means, switch means, junction box, two resistors, bridge rectifier, zener diode, two light emitting diodes, and wiring so that with the contacts of the switch means held in one position bipolar-voltage flows through the over-current means and through one resistor and is reduced to a lower voltage by the resistor parallel connected to the switch means contacts which voltage then flows through the bridge rectifier and is polarized for compatibility with the zener diode and two light emitting diodes and which voltage then flows through the second resistor and lights one light emitting diode, but does not flow through the zener diode and does not light the second light emitting diode; and so that with the contacts of the switch means held in a second position bipolar-voltage flows through the over-current means and through the contacts of the switch means bypassing the first resistor and which voltage then flows through the bridge rectifier and is polarized for compatibility with the zener diode and two light emitting diodes and which voltage then flows through the second resistor and lights one light emitting diode and also flows through the zener diode and lights the second light emitting diode.

28. The improvement of claim 27 wherein the securing device securing the fixed reference tube to the air brake assembly of the vehicle comprises a universal extension bracket secured at one end to the mounting bracket of the air brake assembly of the vehicle and at the other end adapted to adjustably accept and secure the fixed reference tube.

29. The improvement of claim 27 wherein the securing device securing the fixed reference tube to the air brake assembly of the vehicle comprises an extension arm secured at one end to the axle housing of the vehicle and at the other end adapted to accept and secure the fixed reference tube.

30. The improvement of claim 4 wherein the supervised electrical monitoring system comprises an over-current means, switch means, junction box, two resistors, bridge rectifier, zener diode, two light emitting diodes, and wiring so that with the contacts of the switch means held in one position bipolar-voltage flows through the over-current means and through one resistor and is reduced to a lower voltage by the resistor parallel connected to the switch means contacts which voltage then flows through the bridge rectifier and is polarized for compatibility with the zener diode and two light emitting diodes and which voltage then flows through the second resistor and lights one light emitting diode, but does not flow through the zener diode and does not light the second light emitting diode; and so that with the contacts of the switch means held in a second position bipolar-voltage flows through the over-current means and through the contacts of the switch means bypassing the first resistor and which voltage then flows through the bridge rectifier and is polarized for compatibility with the zener diode and two light emitting diodes and which voltage then flows through the second resistor and lights one light emitting diode and also flows through the zener diode and lights the second light emitting diode.

31. The improvement of claim 30 wherein the securing device securing the fixed reference tube to the air brake assembly of the vehicle comprises a universal extension bracket secured at one end to the mounting bracket of the air brake assembly of the vehicle and at the other end adapted to adjustably accept and secure the fixed reference tube.

32. The improvement of claim 30 wherein the securing device securing the fixed reference tube to the air brake assembly of the vehicle comprises an extension arm secured at one end to the axle housing of the vehicle and at the other end adapted to accept and secure the fixed reference tube.

33. The improvement of claim 10 wherein the supervised electrical monitoring system comprises an over-current means, switch means, junction box, two resistors, bridge rectifier, zener diode, two light emitting diodes, and wiring so that with the contacts of the switch means held in one position bipolar-voltage flows through the over-current means and through one resistor and is reduced to a lower voltage by the resistor parallel connected to the switch means contacts which voltage then flows through the bridge rectifier and is polarized for compatibility with the zener diode and two light emitting diodes and which voltage then flows through the second resistor and lights one light emitting diode, but does not flow through the zener diode and does not light the second light emitting diode; and so that with the contacts of the switch means held in a second position bipolar-voltage flows through the over-current means and through the contacts of the switch means bypassing the first resistor and which voltage then flows through the bridge rectifier and is polarized for compatibility with the zener diode and two light emitting diodes and which voltage then flows through the second resistor and lights one light emitting diode and also flows through the zener diode and lights the second light emitting diode.

34. The improvement of claim 33 wherein the securing device securing the fixed reference tube to the air brake assembly of the vehicle comprises a universal extension bracket secured at one end to the mounting bracket of the air brake assembly of the vehicle and at the other end adapted to adjustably accept and secure the fixed reference tube.

35. The improvement of claim 33 wherein the securing device securing the fixed reference tube to the air brake assembly of the vehicle comprises an extension arm secured at one end to the axle housing of the vehicle and at the other end adapted to accept and secure the fixed reference tube.

36. The improvement of claim 27 wherein the power source is a self-energized portable test unit remote from the vehicle comprising a battery, a switch means, wiring, connecting means, and a housing, and adapted to temporarily connect to the continuous electrical circuit for the purpose of brake travel analysis and to energize the electrical monitoring system for operation.

37. The improvement of claim 27 wherein the power source is the vehicle power source in a vehicle having an electrical system.

38. The improvement of claim 36 wherein the securing device securing the fixed reference tube to the air brake assembly of the vehicle comprises a universal extension bracket secured at one end to the mounting bracket of the air brake assembly of the vehicle and at the other end adapted to adjustably accept and secure the fixed reference tube.

39. The improvement of claim 36 wherein the securing device securing the fixed reference tube to the air brake assembly of the vehicle comprises an extension arm secured at one end to the axle housing of the vehicle and at the other end adapted to accept and secure the fixed reference tube.

40. The improvement of claim 37 wherein the securing device securing the fixed reference tube to the air brake assembly of the vehicle comprises a universal extension bracket secured at one end to the mounting bracket of the air brake assembly of the vehicle and at the other end adapted to adjustably accept and secure the fixed reference tube.

41. The improvement of claim 37 wherein the securing device securing the fixed reference tube to the air brake assembly of the vehicle comprises an extension arm secured at one end to the axle housing of the vehicle and at the other end adapted to accept and secure the fixed reference tube.

42. The improvement of claim 30 wherein the power source is a self-energized portable test unit remote from the vehicle comprising a battery, a switch means, wiring, connecting means, and a housing, and adapted to temporarily connect to the continuous electrical circuit for the purpose of brake travel analysis and to energize the electrical monitoring system for operation.

43. The improvement of claim 30 wherein the power source is the vehicle power source in a vehicle having an electrical system.

44. The improvement of claim 42 wherein the securing device securing the fixed reference tube to the air brake assembly of the vehicle comprises a universal extension bracket secured at one end to the mounting bracket of the air brake assembly of the vehicle and at the other end adapted to adjustably accept and secure the fixed reference tube.

45. The improvement of claim 42 wherein the securing device securing the fixed reference tube to the air brake assembly of the vehicle comprises an extension arm secured at one end to the axle housing of the vehicle and at the other end adapted to accept and secure the fixed reference tube.

46. The improvement of claim 43 wherein the securing device securing the fixed reference tube to the air brake assembly of the vehicle comprises a universal extension bracket secured at one end to the mounting bracket of the air brake assembly of the vehicle and at the other end adapted to adjustably accept and secure the fixed reference tube.

47. The improvement of claim 43 wherein the securing device securing the fixed reference tube to the air brake assembly of the vehicle comprises an extension arm secured at one end to the axle housing of the vehicle and at the other end adapted to accept and secure the fixed reference tube.

48. The improvement of claim 33 wherein the power source is a self-extension energized portable test unit remote from the vehicle comprising a battery, a switch means, wiring, connecting means, and a housing, and adapted to temporarily connect to the continuous electrical circuit for the purpose of brake travel analysis and to energize the electrical monitoring system for operation.

49. The improvement of claim 33 wherein the power source is the vehicle power source in a vehicle having an electrical system.

50. The improvement of claim 48 wherein the securing device securing the fixed reference tube to the air brake assembly of the vehicle comprises a universal extension bracket secured at one end to the mounting bracket of the air brake assembly of the vehicle and at the other end adapted to adjustably accept and secure the fixed reference tube.

51. The improvement of claim 48 wherein the securing device securing the fixed reference tube to the air brake assembly of the vehicle comprises an extension arm secured at one end to the axle housing of the vehicle and at the other end adapted to accept and secure the fixed reference tube.

52. The improvement of claim 49 wherein the securing device securing the fixed reference tube to the air brake assembly of the vehicle comprises a universal extension bracket secured at one end to the mounting bracket of the air brake assembly of the vehicle and at the other end adapted to adjustably accept and secure the fixed reference tube.

53. The improvement of claim 49 wherein the securing device securing the fixed reference tube to the air brake assembly of the vehicle comprises an extension arm secured at one end to the axle housing of the vehicle and at the other end adapted to accept and secure the fixed reference tube.

54. The improvement of claim 1 wherein the supervised electrical monitoring system comprises an over-current means, switch means, resistor, junction box, bridge rectifier, zener diode, capacitor, silicon controlled rectifier, two incandescent lamps and wiring, so that with the contacts of the switch means held in one position bipolar voltage flows through the over-current means and through the resistor and is reduced to a lower voltage by the resistor and lights one incandescent lamp but does not flow through the bridge rectifier, zener diode and silicon controlled rectifier and does not light the second incandescent lamp; and so that with the contacts of the switch means held in a second position bipolar voltage flows through the over-current means and through the contacts of the switch means bypassing the resistor and lights one incandescent lamp and which voltage also flows through the bridge rectifier and is polarized for compatibility with the zener diode, silicon controlled rectifier, and capacitor, and which voltage then flows through the zener diode and silicon controlled rectifier and lights the second incandescent lamp and the capacitor prevents inadvertent operation of the second incandescent lamp.

55. The improvement of claim 54 wherein the securing device securing the fixed reference tube to the air brake assembly of the vehicle comprises a universal extension bracket secured at one end to the mounting bracket of the air brake assembly of the vehicle and at the other end adapted to adjustably accept and secure the fixed reference tube.

56. The improvement of claim 54 wherein the securing device securing the fixed reference tube to the air brake assembly of the vehicle comprises an extension arm secured at one end to the axle housing of the vehicle and at the other end adapted to accept and secure the fixed reference tube.

57. The improvement of claim 4 wherein the supervised electrical monitoring system comprises an over-current means, switch means, resistor, junction box, bridge rectifier, zener diode, capacitor, silicon controlled rectifier, two incandescent lamps and wiring, so that with the contacts of the switch means held in one position bipolar voltage flows through the over-current means and through the resistor and is reduced to a lower voltage by the resistor and lights one incandescent lamp but does not flow through the bridge rectifier, zener diode and silicon controlled rectifier and does not light the second incandescent lamp; and so that with the contacts of the switch means held in a second position bipolar voltage flows through the over-current means and through the contacts of the switch means bypassing the resistor and lights one incandescent lamp and which voltage also flows through the bridge rectifier and is polarized for compatibility with the zener diode, silicon controlled rectifier, and capacitor, and which voltage then flows through the zener diode and silicon controlled rectifier and lights the second incandescent lamp and the capacitor prevents inadvertent operation of the second incandescent lamp.

58. The improvement of claim 57 wherein the securing device securing the fixed reference tube to the air brake assembly of the vehicle comprises a universal extension bracket secured at one end to the mounting bracket of the air brake assembly of the vehicle and at the other end adapted to adjustably accept and secure the fixed reference tube.

59. The improvement of claim 57 wherein the securing device securing the fixed reference tube to the air brake assembly of the vehicle comprises an extension arm secured at one end to the axle housing of the vehicle and at the other end adapted to accept and secure the fixed reference tube.

60. The improvement of claim 10 wherein the supervised electrical monitoring system comprises an over-current means, switch means, resistor, junction box, bridge rectifier, zener diode, capacitor, silicon controlled rectifier, two incandescent lamps and wiring so that with the contacts of the switch means held in one position bipolar voltage flows through the over-current means and through the resistor and is reduced to a lower voltage by the resistor and lights one incandescent lamp but does not flow through the bridge rectifier, zener diode and silicon controlled rectifier and does not light the second incandescent lamp; and so that with the contacts of the switch means held in a second position bipolar voltage flows through the over-current means and through the contacts of the switch means bypassing the resistor and lights one incandescent lamp and which voltage also flows through the bridge rectifier and is polarized for compatibility with the zener diode, silicon controlled rectifier, and capacitor, and which voltage then flows through the zener diode and silicon controlled rectifier and lights the second incandescent lamp and the capacitor prevents inadvertent operation of the second incandescent lamp.

61. The improvement of claim 60 wherein the securing device securing the fixed reference tube to the air brake assembly of the vehicle comprises a universal extension bracket secured at one end to the mounting bracket of the air brake assembly of the vehicle and at the other end adapted to adjustably accept and secure the fixed reference tube.

62. The improvement of claim 60 wherein the securing device securing the fixed reference tube to the air brake assembly of the vehicle comprises an extension arm secured at one end to the axle housing of the vehicle and at the other end adapted to accept and secure the fixed reference tube.

63. The improvement of claim 54 wherein the power source is a self-energized portable test unit remote from the vehicle comprising a battery, a switch means, wiring, connecting means, and a housing and adapted to temporarily connect to the continuous electrical circuit for the purpose of brake travel analysis and to energize the electrical monitoring system for operation.

64. The improvement of claim 54 wherein the power source is the vehicle power source in a vehicle having an electrical system.

65. The improvement of claim 63 wherein the securing device securing the fixed reference tube to the air brake assembly of the vehicle comprises a universal extension bracket secured at one end to the mounting bracket of the air brake assembly of the vehicle and at the other end adapted to adjustably accept and secure the fixed reference tube.

66. The improvement of claim 63 wherein the securing device securing the fixed reference tube to the air brake assembly of the vehicle comprises an extension arm secured at one end to the axle housing of the vehicle and at the other end adapted to accept and secure the fixed reference tube.

67. The improvement of claim 64 wherein the securing device securing the fixed reference tube to the air brake assembly of the vehicle comprises a universal extension bracket secured at one end to the mounting bracket of the air brake assembly of the vehicle and at the other end adapted to adjustably accept and secure the fixed reference tube.

68. The improvement of claim 64 wherein the securing device securing the fixed reference tube to the air brake assembly of the vehicle comprises an extension arm secured at one end to the axle housing of the vehicle and at the other end adapted to accept and secure the fixed reference tube.

69. The improvement of claim 57 wherein the power source is a self-energized portable test unit remote from the vehicle comprising a battery, a switch means, wiring, connecting means, and a housing and adapted to temporarily connect to the continuous electrical circuit for the purpose of brake travel analysis and to energize the electrical monitoring system for operation.

70. The improvement of claim 57 wherein the power source is the vehicle power source in a vehicle having an electrical system.

71. The improvement of claim 69 wherein the securing device securing the fixed reference tube to the air brake assembly of the vehicle comprises a universal extension bracket secured at one end to the mounting bracket of the air brake assembly of the vehicle and at the other end adapted to adjustably accept and secure the fixed reference tube.

72. The improvement of claim 69 wherein the securing device securing the fixed reference tube to the air brake assembly of the vehicle comprises an extension arm secured at one end to the axle housing of the vehicle and at the other end adapted to accept and secure the fixed reference tube.

73. The improvement of claim 70 wherein the securing device securing the fixed reference tube to the air brake assembly of the vehicle comprises a universal extension bracket secured at one end to the mounting bracket of the air brake assembly of the vehicle and at the other end adapted to adjustably accept and secure the fixed reference tube.

74. The improvement of claim 70 wherein the securing device securing the fixed reference tube to the air brake assembly of the vehicle comprises an extension arm secured at one end to the axle housing of the vehicle and at the other end adapted to accept and secure the fixed reference tube.

75. The improvement of claim 60 wherein the power source is a self-energized portable test unit remote from the vehicle comprising a battery, a switch means, wiring, connecting means, and a housing, and adapted to temporarily connect to the continuous electrical circuit for the purpose of brake travel analysis and to energize the electrical monitoring system for operation.

76. The improvement of claim 60 wherein the power source is the vehicle power source in a vehicle having an electrical system.

77. The improvement of claim 75 wherein the securing device securing the fixed reference tube to the air brake assembly of the vehicle comprises a universal extension bracket secured at one end to the mounting bracket of the air brake assembly of the vehicle and at the other end adapted to adjustably accept and secure the fixed reference tube.

78. The improvement of claim 75 wherein the securing device securing the fixed reference tube to the air brake assembly of the vehicle comprises an extension arm secured at one end to the axle housing of the vehicle and at the other end adapted to accept and secure the fixed reference tube.

79. The improvement of claim 76 wherein the securing device securing the fixed reference tube to the air brake assembly of the vehicle comprises a universal extension bracket secured at one end to the mounting bracket of the air brake assembly of the vehicle and at the other end adapted to adjustably accept and secure the fixed reference tube.

80. The improvement of claim 76 wherein the securing device securing the fixed reference tube to the air brake assembly of the vehicle comprises an extension arm secured at one end to the axle housing of the vehicle and at the other end adapted to accept and secure the fixed reference tube.

81. The improvement of claim 1 wherein the supervised electrical monitoring system comprises an over-current means, bridge rectifier, integrated circuit, switch means, resistor, bicolor light emitting diode, and wiring so that with the contacts of the switch means held in one position, bipolar voltage flows through the over-current means and bridge rectifier and is polarized for compatibility with the integrated circuit and bicolor light emitting diode, and which voltage then energizes the integrated circuit and energizes one contact of the switch means with a negative polarity voltage and a second contact of the switch means with a positive polarity voltage, and a negative polarity voltage flows through the switch means and resistor and light the first color of the bicolor light emitting diode but does not light the second color of the bicolor light emitting diode; and so that with the contacts of the switch means held in a second position, bipolar voltage flows through the over-current means and bridge rectifier and is polarized for compatibility with the integrated circuit and bicolor light emitting diode, and which voltage then energizes the integrated circuit and energizes one contact of the switch means with a negative polarity voltage and a second contact of the switch means with a positive polarity voltage, and a positive polarity voltage flows through the switch means and resistor and lights the second color of the bicolor light emitting diode but does not light the first color of the bicolor light emitting diode.

82. The improvement of claim 81 wherein the securing device securing the fixed reference tube to the air brake assembly of the vehicle comprises a universal extension bracket secured at one end to the mounting bracket of the air brake assembly of the vehicle and at the other end adapted to adjustably accept and secure the fixed reference tube.

83. The improvement of claim 81 wherein the securing device securing the fixed reference tube to the air brake assembly of the vehicle comprises an extension arm secured at one end to the axle housing of the vehicle and at the other end adapted to accept and secure the fixed reference tube.

84. The improvement of claim 4 wherein the supervised electrical monitoring system comprises an over-current means, bridge rectifier, integrated circuit, switch means, resistor, bicolor light emitting diode, and wiring so that with the contacts of the switch means held in one position, bipolar voltage flows through the over-current means and bridge rectifier and is polarized for compatibility with the integrated circuit and bicolor light emitting diode, and which voltage then energizes the integrated circuit and energizes one contact of the switch means with a negative polarity voltage and a second contact of the switch means with a positive polarity voltage, and a negative polarity voltage flows through the switch means and resistor and lights the first color of the bicolor light emitting diode but does not light the second color of the bicolor light emitting diode; and so that with the contacts of the switch means held in a second position, bipolar voltage flows through the over-current means and bridge rectifier and is polarized for compatibility with the integrated circuit and bicolor light emitting diode, and which voltage then energizes the integrated circuit and energizes one contact of the switch means with a negative polarity voltage and a second contact of the switch means with a positive polarity voltage, and a positive polarity voltage flows through the switch means and resistor and lights the second color of the bicolor light emitting diode but does not light the first color of the bicolor light emitting diode.

85. The improvement of claim 84 wherein the securing device securing the fixed reference tube to the air brake assembly of the vehicle comprises a universal extension bracket secured at one end to the mounting bracket of the air brake assembly of the vehicle and at the other end adapted to adjustably accept and secure the fixed reference tube.

86. The improvement of claim 84 wherein the securing device securing the fixed reference tube to the air brake assembly of the vehicle comprises an extension arm secured at one end to the axle housing of the vehicle and at the other end adapted to accept and secure the fixed reference tube.

87. The improvement of claim 10 wherein the supervised electrical monitoring system comprises an over-current means, bridge rectifier, integrated circuit, switch means, resistor, bicolor light emitting diode, and wiring so that with the contacts of the switch means held in one position, bipolar voltage flows through the over-current means and bridge rectifier and is polarized for compatibility with the integrated circuit and bicolor light emitting diode, and which voltage then energizes the integrated circuit and energizes one contact of the switch means with a negative polarity voltage and a second contact of the switch means with a positive polarity voltage, and a negative polarity voltage flows through the switch means and resistor and lights the first color of the bicolor light emitting diode but does not light the second color of the bicolor light emitting diode; and so that with the contacts of the switch means held in a second position, bipolar voltage flows through the over-current means and bridge rectifier and is polarized for compatibility with the integrated circuit and bicolor light emitting diode, and which voltage then energizes the integrated circuit and energizes one contact of the switch means with a negative polarity voltage and a second contact of the switch means with a positive polarity voltage, and a positive polarity voltage flows through the switch means and resistor and lights the second color of the bicolor light emitting diode but does not light the first color of the bicolor light emitting diode.

88. The improvement of claim 87 wherein the securing device securing the fixed reference tube to the air brake assembly of the vehicle comprises a universal extension bracket secured at one end to the mounting bracket of the air brake assembly of the vehicle and at the other end adapted to adjustably accept and secure the fixed reference tube.

89. The improvement of claim 87 wherein the securing device securing the fixed reference tube to the air brake assembly of the vehicle comprises an extension arm secured at one end to the axle housing of the vehicle and at the other end adapted to accept and secure the fixed reference tube.

90. The improvement of claim 81 wherein the power source is a self-energized portable test unit remote from the vehicle comprising a battery, a switch means, wiring, connecting means, and a housing and adapted to temporarily connect to the continuous electrical circuit for the purpose of brake travel analysis and to energize the electrical monitoring system for operation.

91. The improvement of claim 81 wherein the power source is the vehicle power source in a vehicle having an electrical system.

92. The improvement of claim 90 wherein the securing device securing the fixed reference tube to the air brake assembly of the vehicle comprises a universal extension bracket secured at one end to the mounting bracket of the air brake assembly of the vehicle and at the other end adapted to adjustably accept and secure the fixed reference tube.

93. The improvement of claim 90 wherein the securing device securing the fixed reference tube to the air brake assembly of the vehicle comprises an extension arm secured at one end to the axle housing other end adapted to accept and secure the fixed reference tube.

94. The improvement of claim 91 wherein the securing device securing the fixed reference tube to the air brake assembly of the vehicle comprises a universal extension bracket secured at one end to the mounting bracket of the air brake assembly of the vehicle and at the other end adapted to adjustably accept and secure the fixed reference tube.

95. The improvement of claim 91 wherein the securing device securing the fixed reference tube to the air brake assembly of the vehicle comprises an extension arm secured at one end to the axle housing of the vehicle and at the other end adapted to accept and secure the fixed reference tube.

96. The improvement of claim 84 wherein the power source is a self-energized portable test unit remote from the vehicle comprising a battery, a switch means, wiring, connecting means, and a housing and adapted to temporarily connect to the continuous electrical circuit for the purpose of brake travel analysis and to energize the electrical monitoring system for operation.

97. The improvement of claim 84 wherein the power source is the vehicle power source in a vehicle having an electrical system.

98. The improvement of claim 96 wherein the securing device securing the fixed reference tube to the air brake assembly of the vehicle comprises a universal extension bracket secured at one end to the mounting bracket of the air brake assembly of the vehicle and at the other end adapted to adjustably accept and secure the fixed reference tube.

99. The improvement of claim 96 wherein the securing device securing the fixed reference tube to the air brake assembly of the vehicle comprises an extension arm secured at one end to the axle housing of the vehicle and at the other end adapted to accept and secure the fixed reference tube.

100. The improvement of claim 97 wherein the securing device securing the fixed reference tube to the air brake assembly of the vehicle comprises a universal extension bracket secured at one end to the mounting bracket of the air brake assembly of the vehicle and at the other end adapted to adjustably accept and secure the fixed reference tube.

101. The improvement of claim 97 wherein the securing device securing the fixed reference tube to the air brake assembly of the vehicle comprises an extension arm secured at one end to the axle housing of the vehicle and at the other end adapted to accept and secure the fixed reference tube.

102. The improvement of claim 87 wherein the power source is a self-energized portable test unit remote from the vehicle comprising a battery, a switch means, wiring, connecting means, and a housing, and adapted to temporarily connect to the continuous electrical circuit for the purpose of brake travel analysis and to energize the electrical monitoring system for operation.

103. The improvement of claim 87 wherein the power source is the vehicle power source in a vehicle having an electrical system.

104. The improvement of claim 102 wherein the securing device securing the fixed reference tube to the air brake assembly of the vehicle comprises a universal extension bracket secured at one end to the mounting bracket of the air brake assembly of the vehicle and at the other end adapted to adjustably accept and secure the fixed reference tube.

105. The improvement of claim 102 wherein the securing device securing the fixed reference tube to the air brake assembly of the vehicle comprises an extension arm secured at one end to the axle housing of the vehicle and at the other end adapted to accept and secure the fixed reference tube.

106. The improvement of claim 103 wherein the securing device securing the fixed reference tube to the air brake assembly of the vehicle comprises a universal extension bracket secured at one end to the mounting bracket of the air brake assembly of the vehicle and at the other end adapted to adjustably accept and secure the fixed reference tube.

107. The improvement of claim 103 wherein the securing device securing the fixed reference tube to the air brake assembly of the vehicle comprises an extension arm secured at one end to the axle housing of the vehicle and at the other end adapted to accept and secure the fixed reference tube.

* * * * *